United States Patent [19]
Krippl

[11] Patent Number: 5,196,239
[45] Date of Patent: Mar. 23, 1993

[54] PROCESS FOR UNIFORM DISTRIBUTION OF A FREE-FLOWING REACTION MIXTURE ONTO A CONTINUOUSLY TRANSPORTED SUBSTRATE

[75] Inventor: Kurt Krippl, Monheim, Fed. Rep. of Germany

[73] Assignee: Bayer Aktiengesellschaft, Leverkusen Bayerwerk, Fed. Rep. of Germany

[21] Appl. No.: 699,531

[22] Filed: May 14, 1991

Related U.S. Application Data

[63] Continuation-in-part of Ser. No. 449,690, Dec. 12, 1989, abandoned.

[30] Foreign Application Priority Data

Dec. 17, 1988 [DE] Fed. Rep. of Germany ....... 3842625

[51] Int. Cl.$^5$ ............................................... B05D 3/04
[52] U.S. Cl. ...................................... 427/348; 118/63; 264/46.4
[58] Field of Search ........................... 425/4 C, 817 C; 264/45.8, 46.4, 500, 555, 556; 118/58, 63; 427/331, 348, 420, 428, 444; 162/135

[56] References Cited

U.S. PATENT DOCUMENTS

| | | | |
|---|---|---|---|
| 3,197,531 | 7/1965 | Wilbur, Jr. | 264/500 |
| 3,872,199 | 3/1975 | Ottinger | 264/46.3 |
| 3,931,098 | 1/1976 | Herweg et al. | 264/45.8 |
| 3,953,626 | 4/1976 | Suzuki et al. | 264/500 |
| 4,216,181 | 8/1980 | Ebeling et al. | 264/45.8 |
| 4,260,353 | 4/1981 | Buchert et al. | 425/817 C |
| 4,371,488 | 2/1983 | Phipps et al. | 425/817 C |

FOREIGN PATENT DOCUMENTS

| | | | |
|---|---|---|---|
| 1778951 | 12/1971 | Fed. Rep. of Germany . | |
| 57-42634 | 4/1981 | Japan | 264/45.8 |
| 1-120318 | 5/1989 | Japan | 425/817 C |
| 1031753 | 6/1966 | United Kingdom . | |

*Primary Examiner*—Jay H. Woo
*Assistant Examiner*—Robert B. Davis
*Attorney, Agent, or Firm*—Joseph C. Gil

[57] ABSTRACT

The present invention relates to a process and a device for uniform distribution of a free-flowing reaction mixture onto a continuously transported substrate over the desired width during production of foam webs. The distribution takes place towards the sides from a feed point by means of air.

1 Claim, 2 Drawing Sheets

PROCESS FOR UNIFORM DISTRIBUTION OF A FREE-FLOWING REACTION MIXTURE ONTO A CONTINUOUSLY TRANSPORTED SUBSTRATE

CROSS REFERENCE TO RELATED APPLICATION

This application is a continuation-in-part of U.S. application Ser. No. 07/449,690, filed on Dec. 12, 1989.

BACKGROUND OF THE INVENTION

The present invention relates to a process and a device for uniform distribution of a free-flowing reaction mixture onto a continuously transported substrate over the desired width during production of foam webs. The distribution takes place by means of a stream of air.

The simplest method of applying a foamable reaction mixture to a moving substrate is to centrally feed the mixture onto the substrate, which is generally a paper web carried on the conveyor belt, and to allow the reaction mixture simply to run outwards. The paper web prevents the reaction mixture from adhering to the conveyor belt. Generally, the film of reaction mixture which forms is of uneven thickness. The differences in thickness are compensated somewhat during foaming; however, the cell structure of the resultant foam is generally not uniform.

Distribution rollers have therefore already been used. However, these can be employed economically only for the production of foam webs which have covering sheets on both sides to prevent the distribution rollers from contacting the reaction mixture. Since a bulge of reaction mixture must form in front of the distribution rollers, the residence times are relatively high.

For this reason, attempts have been made (German Offenlegungsschrift 1,778,951) to distribute the bulge more quickly towards the sides using jets of air issuing from blow nozzles, in order to shorten the residence time. However, this measure is also unsatisfactory, because the streams of air impinge almost perpendicularly on to the film of mixture and at the point of impingement drive the mixture almost completely towards the sides.

German Auslegeschrift 1,296,791 (corresponding to GB 1,031,753) discloses arranging an air chamber containing a porous plate over the width of the substrate, from which plate an airstream field issues countercurrently to the film of mixture. The degree of distribution is low when using such an air chamber, since there is no transversely distributing current.

The object of the present invention was to improve the distribution of the reaction mixture to thereby achieve a film of uniform thickness having a relatively short residence time.

DETAILED DESCRIPTION OF THE INVENTION

Figure 1:
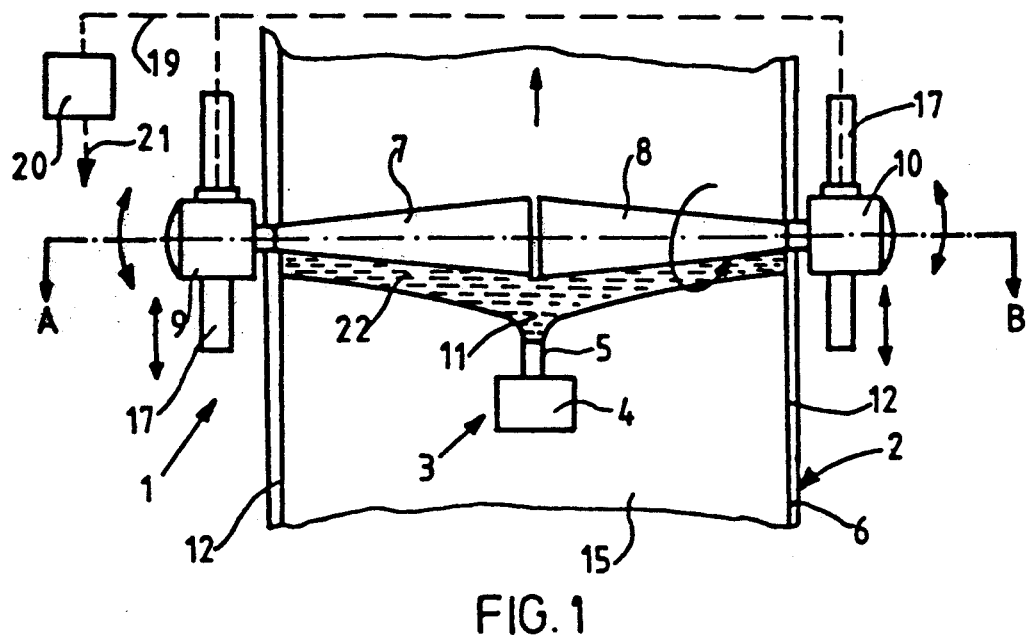
FIG. 1 is a top view of a distribution device according to a first embodiment of the present invention.

The above noted object is achieved by a procedure in which the distribution of the foamable reaction mixture is carried out by means of a stream of air produced by ventilation above the substrate. As a result, the stream of air produced acts in two dimensions on the reaction mixture. In this way, a particularly uniform distribution in the form of a closed flow field diagonally outwards is obtained. The residence time is kept relatively low by this procedure, which means that the homogeneity of the foam is improved.

The device for the uniform distribution of the reaction mixture is located above the conveyor belt and downstream of the mixture feed device. The key to the present invention resides in the use of two ventilator rolls which are positioned in mirror image arrangement at right angles to the conveying direction of the conveyor belt. The ventilator rolls are linked to a drive, and have a diameter which decreases from the reaction mixture feed point towards the sides.

The surface of the ventilator rolls can be smooth. Grooves, ribs or wings, especially if they are directional, increase the intensity or transverse distribution action of the stream of air. A distribution roller need not be used. Thus, the new device can be employed not only for twin conveyor belt lines but also for foam slab stock lines using single belts. The direction of rotation of the ventilator rolls is set so that the direction coincides with the conveying direction of the conveyor belt. In this way, the air flow produced by the ventilator rolls "sucks" the reaction mixture and conveys it from the feed point towards the sides. The air stream produced by the ventilator rollers flows in the same direction as the conveyed substrate. Thus, the reaction mixture is transported in the conveying direction and laterally towards the sides. The invention thus avoids the formation of a "bank", or bulge, of reaction mixture as is generally done by following prior art processes.

The intensity of the air flow can also be varied via the speed of rotation of the ventilator rolls. The ventilator rolls should not dip into the reaction mixture; i.e. the distance between the substrate (or, conveyor surface) and ventilator roll must at all points be greater than the covering of reaction mixture at its thickest point, i.e. at or downstream of the mixture feed point.

The ventilator rolls are preferably on swivel mountings perpendicular to the conveyor belt. The ventilator rolls can also be placed on swivel mountings parallel to the conveyor belt. The transverse distribution can in this way also be influenced.

Another particular embodiment is characterized in that the ventilator rolls are mounted so that they are adjustable in height. This means that the gap between the substrate and ventilator rolls can be adjusted. The distance between the ventilator rolls and the mixture feed point is also preferably adjustable. In this manner it is possible to optimize the distribution of the mixture so that the jet of reaction mixture fed in has already spread sufficiently towards the sides before the film of mixture enters the region of air flow. A different setting of the distance may be necessary if the conveyor belt speed is Changed.

The ventilator rolls are advantageously replaceable. A pair of rolls of suitable diameter or suitable jacket structure can be selected according to requirements. As a rule, the jacket structure is in truncated cone form;

however, a dynamically balanced hyperbolic or parabolic structure may also be advantageous.

Figure 2:
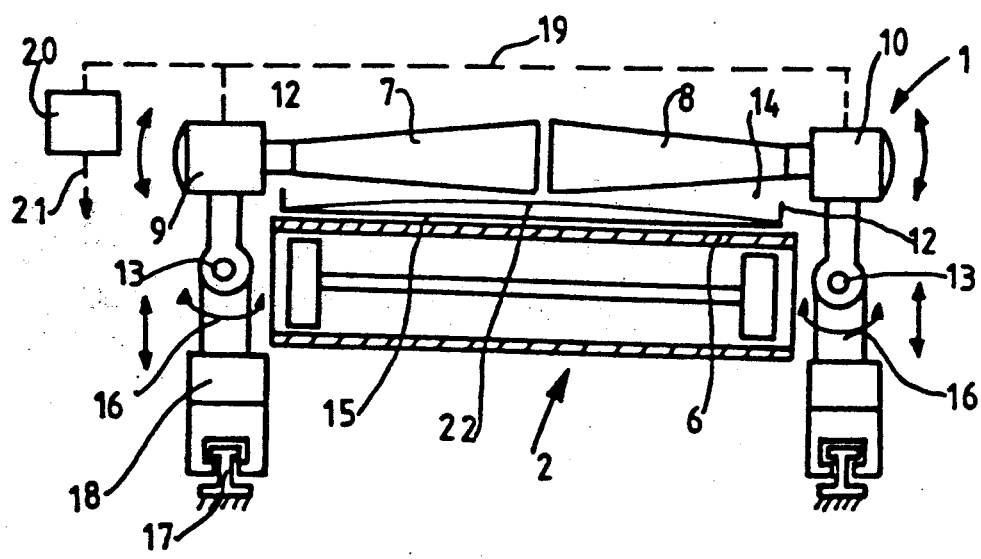
FIG. 2 shows a section along line A-B of FIG. 1.

The new distribution device will now be discussed with reference to the drawings. In FIGS. 1 and 2, the device 1 for uniform distribution of the reaction mixture is associated with a twin conveyor belt, of which only the lower conveyor belt 2 and the mixture feed device 3, which consists of a mix head 4 with discharge tube 5, are shown. The mix head 4 with its discharge tube 5 is positioned permanently and centrally above the carrying run 6 of the conveyor belt 2. The device 1 consists of two symmetrically positioned ventilator rolls 7, 8 which are in mirror image arrangement and have smooth surfaces. The rolls 7,8 have drives 9, 10 connected thereto. These ventilator rolls 7, 8 are replaceable, and have their greatest diameter downstream of the mixture feed point 11 at a location which would correspond to an extension of the mixture feed point 11. The diameter of the ventilator rolls reduces like a truncated cone towards the limits 12 for the foam width. The drives 9, 10 are mounted to swivel around axes 13 in the vertical plane at right angles to the conveyor belt 2, so that the opening angle of the gap 14 between the ventilator rolls 7, 8 and the top layer of paper 15 conveyed on the conveyor belt 2 can be adjusted according to requirements. The ventilator rolls 7, 8 are also mounted such that they are adjustable in height, by positioning the drives 9, 10 on supports 16 of adjustable height. These are mounted on blocks 18 which can be pushed longitudinally on tracks 17, so that the distance between the ventilator rolls 7, 8 and the feed point 11 can be selected. Finally the supports 16 are also mounted to swivel around their axes, so that the ventilator rolls 7, 8 can be swivel led parallel to the carrying run 6 of the conveyor belt 2. The drives 7, 8 are coupled via a pulse line 19 to a speed regulator 20 so that they have the same speed of rotation. The speed regulator 20 is coupled on the other side with the drive, which is not shown, of the conveyor belt 2 via a pulse line 21, so that if the conveying speed of the conveyor belt 2 changes, the speed of rotation of the ventilator rolls 7, 8 can be changed at the same time in a fixed ratio. The reaction mixture which is distributed is designated 22.

Figure 3:
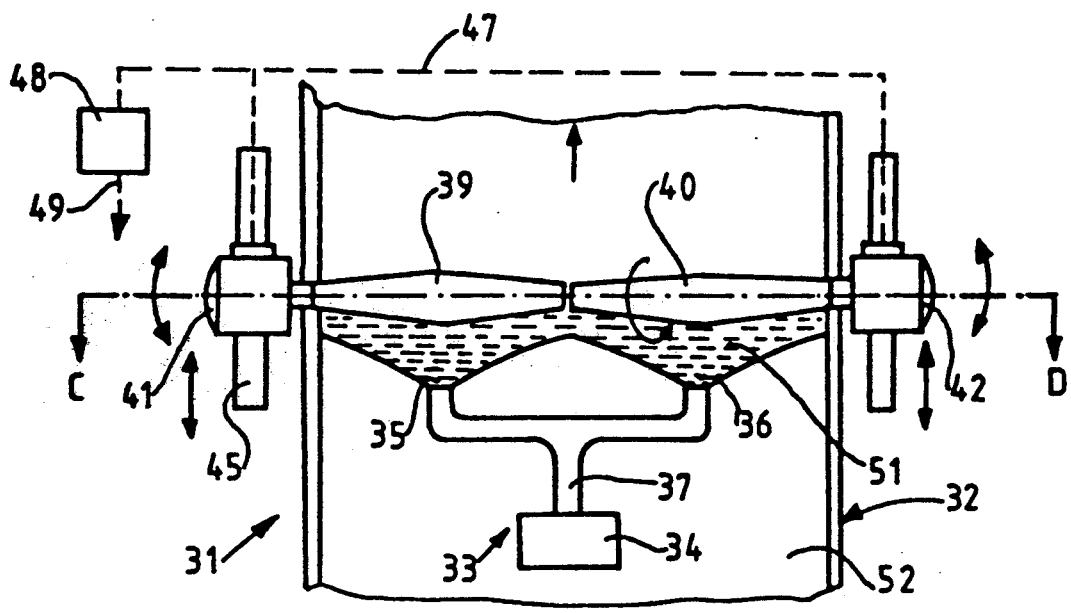
FIG. 3 is a top view of a distribution device according to a second embodiment of the present invention.
Figure 4:
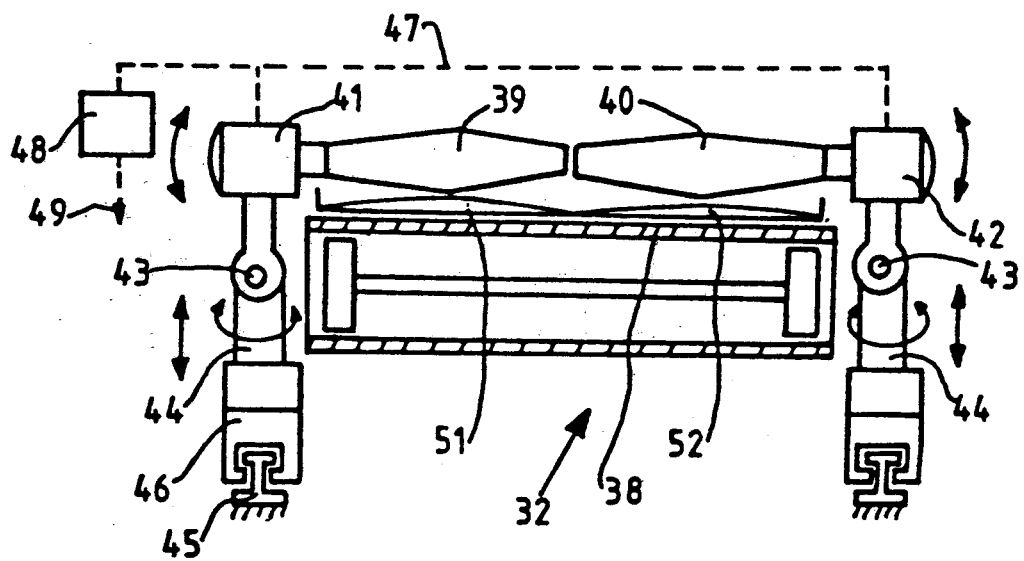
FIG. 4 shows a section along line C-D of FIG. 3.

In FIGS. 3 and 4, the device 31 for uniform distribution of the reaction mixture is associated with a twin conveyor belt, of which only the lower conveyor belt 32 is shown, and the mixture feed device 33, which consists of a mix head 34 and a discharge tube 37 which branches into two feed points 35, 36. The mix head 34 is positioned centrally above the carrying run 38 of the conveyor belt 32. The device 31 consists of two symmetrically positioned ventilator rolls 39, 40 in mirror image arrangement. The rolls have smooth surfaces, and are associated with drives 41, 42. These ventilator rolls 39, 40 are replaceable. They have their greatest diameter in the extension of the mixture feed points 35, 36 and narrow like a truncated cone towards both sides. The drives 41, 42 are mounted to swivel around axes 43 in the perpendicular plane at right angles to the conveyor belt 32, so that the angle between the ventilator rolls 39, 40 and the carrying run 38 can be adjusted. The ventilator rolls 39, 40 are also mounted such that they are adjustable in height, in that the drives 41, 42 are positioned on supports 44 of adjustable height. These are mounted on blocks 46 which can be pushed in the longitudinal direction on tracks 45, so that the ventilator rolls 39, 40 can be swivel led parallel to the carrying run 38 of the conveyor belt 32. The drives 41, 42 are coupled via pulse lines 47 to a speed regulator 48, so that they have the same speed of rotation. The speed regulator 48 is coupled on the other side with a drive, which is not shown, of the conveyor belt 32 via a pulse line 49, so that when the conveying speed of the conveyor belt 32 changes, the speed of rotation of the ventilator rolls 39, 40 can be changed at the same time in a fixed ratio. The reaction mixture which spreads out on the top layer of paper 50 conveyed on the carrying run 38 is designated 51.

Figure 5:
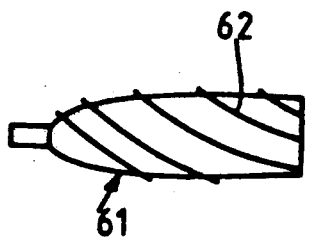
FIGS. 5 and 6 show one particular embodiments of ventilator rolls.
Figure 6:
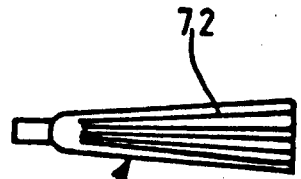

In FIG. 5, the ventilator roll 61 is paraboloid in shape and has thread-like wings 62. In FIG. 6, the ventilator roll 71 Is hyperboloid in shape and has radial wings 72.

Although the invention has been described in detail in the foregoing for the purpose of Illustration, it is to be understood that such detail Is solely for that purpose and that variations can be made therein by those skilled in the art without departing from the spirit and scope of the invention except as it may be limited by the claims.

What is claimed is:

1. In a process for uniformly distributing a free-flowing reaction mixture on a continuously conveyed substrate wherein said reaction mixture is applied to said substrate at a feed point and wherein a stream of air is directed onto said reaction mixture downstream of said feed point, the improvement wherein said stream of air is produced by two rotating ventilator rollers 1) positioned above said substrate at right angles to the conveying direction and 2) rotating in said conveying direction, whereby said stream of air flows in the same direction as the conveyed substrate and conveys said reaction mixture laterally from said feed point towards the sides of said substrate.

* * * * *